United States Patent [19]

Tolley

[11] 4,119,696

[45] Oct. 10, 1978

[54] PRODUCTION OF TITANIUM METAL VALUES

[75] Inventor: William K. Tolley, Arlington Heights, Ill.

[73] Assignee: UOP Inc., Des Plaines, Ill.

[21] Appl. No.: 851,098

[22] Filed: Nov. 14, 1977

[51] Int. Cl.² .............................................. C01G 23/06
[52] U.S. Cl. ........................................ 423/53; 423/68; 423/82; 423/85; 423/150
[58] Field of Search ....................... 423/82, 83, 85, 86, 423/150, 611, 612, 140, 141, 481, 488, 633, 53, 62, 68; 75/1 TI

[56] References Cited

U.S. PATENT DOCUMENTS

| | | | |
|---|---|---|---|
| 2,113,946 | 4/1938 | Plechner et al. | 423/612 |
| 3,407,033 | 10/1968 | Rüter et al. | 423/83 |
| 3,518,054 | 6/1970 | Kulling et al. | 423/83 |
| 3,649,243 | 3/1972 | Williams et al. | 75/1 TI |
| 3,787,139 | 1/1974 | Oster | 423/82 |
| 3,897,537 | 7/1975 | Robinson et al. | 423/82 |
| 3,903,239 | 9/1975 | Berkovich | 423/82 |

*Primary Examiner*—Brian Hearn
*Attorney, Agent, or Firm*—James R. Hoatson, Jr.; Raymond H. Nelson; William H. Page, II

[57] ABSTRACT

Titanium metal values may be recovered from a metal bearing source by subjecting the source to an oxidation step. The oxidized source is then divided, one portion being set to a reductive roast followed by leaching with hydrochloric acid. Thereafter, the remaining portion of the oxidized source is brought into contact with the leached solution whereby titanium dioxide is precipitated. The precipitated titanium dioxide is separated and recovered while the soluble metal values are treated for recovery thereof with a concurrent formation of hydrogen chloride, the latter being recycled back to the leaching zone.

8 Claims, 1 Drawing Figure

U.S. Patent
Oct. 10, 1978
4,119,696
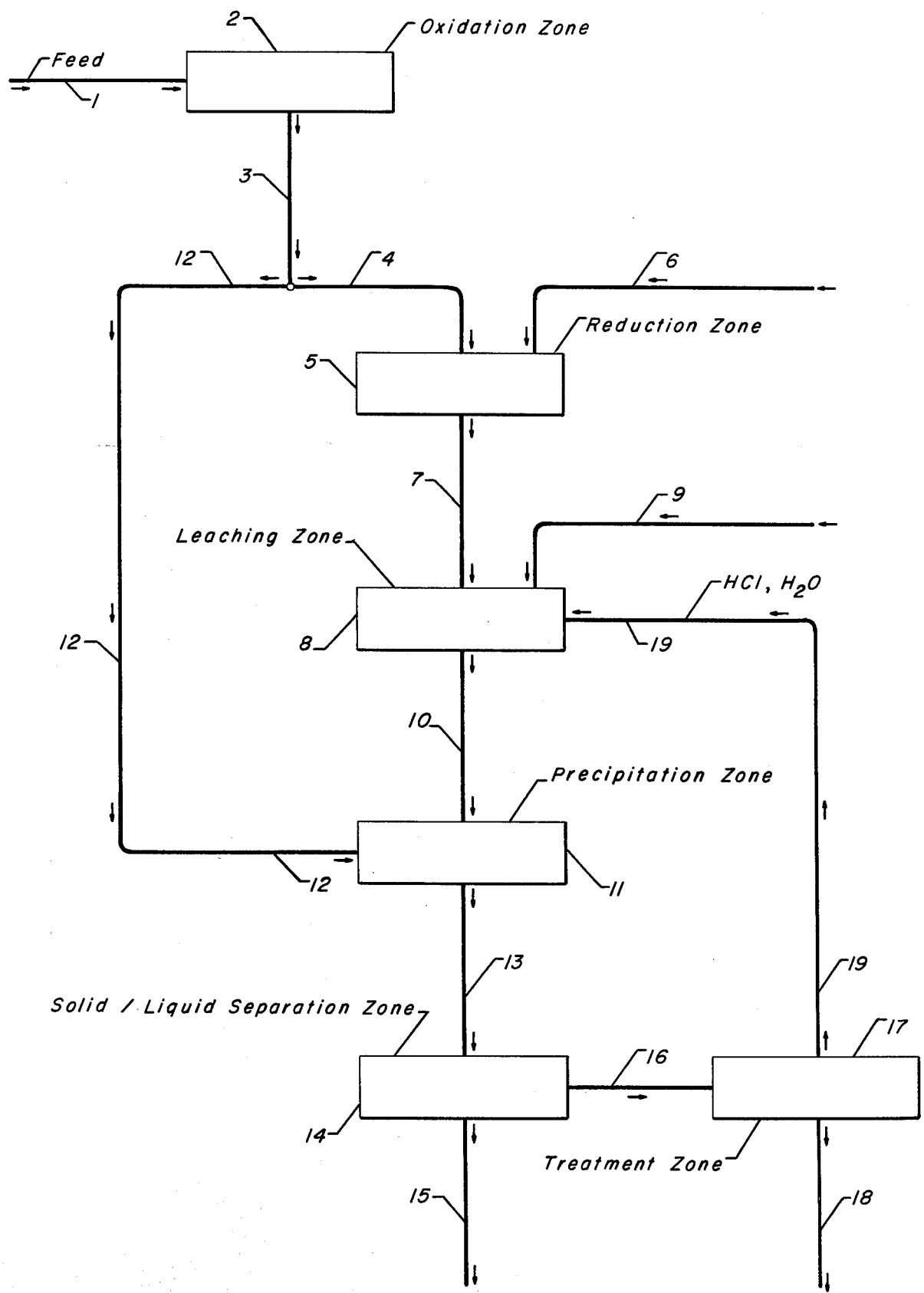

PRODUCTION OF TITANIUM METAL VALUES

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, printing inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

In contradistinction to these prior art methods of recovering titanium values from a titanium metal bearing source, it has now been discovered that titanium dioxide may be prepared by reaction with an iron oxide in a relatively simple process flow.

SPECIFICATION

This invention relates to a process for obtaining titanium metal values from a titanium metal bearing source. More specifically, the invention is concerned with a process for recovering titanium from a titanium bearing source such as ilmenite whereby a greater amount of titanium is obtained. The advantages of utilizing the process of the present invention are found in the fact that the reactions may be effected in a relatively short period of time, the steps of the process may all be effected at atmospheric pressure, thus obviating the use of relatively expensive and complicated equipment. In addition to the aforesaid advantages, it is possible to obtain a high degree of titanium recovery using relatively low grade ores such as ilmenite as the starting material. Other advantages which may also be present in the process of this invention are that the leaching solution possesses an excellent stability at relatively high temperatures due to the high reducing potential of the solutions which are employed; the recovery of titanium dioxide as rutile is effected at temperatures less than the boiling point of the solution with a corresponding high purity of the desired product and that the acid which is used for the leaching solution need not be diluted to precipitate the titanium dioxide, thus decreasing the demand for water.

It is therefore an object of this invention to provide an improved process for the production of titanium metal values.

A further object of this invention is to provide a hydrometallurgical process for obtaining high yields of titanium metal values from titanium bearing sources.

In one aspect an embodiment of this invention resides in a process for the recovery of titanium values from a titanium bearing source which contains other metal values, said process comprising the steps of oxidizing said source to convert iron values contained therein to iron oxide, subjecting a portion of said oxidized source to a reductive roast at an elevated temperature, leaching the resultant reduced source with a hydrogen chloride source in a leaching zone, precipitating said leached titanium bearing source by contact with the remaining portion of said oxidized source containing iron oxides, separating and recovering the precipitated titanium values from soluble metal sources, treating said soluble metal source to recover other metal values and form hydrogen chloride, and recycling said hydrogen chloride source to said leaching zone.

A specific embodiment of this invention is found in a process for the recovery of titanium values from a titanium bearing source such as ilmenite which comprises subjecting said ilmenite to an oxidation step at a temperature in the range of from about ambient to about 800° C. in an oxidizing atmosphere, subjecting a portion of the said oxidized source to a reductive roast at an elevated temperature in the range of from about 600° to about 1000° C. in a reducing atmosphere, leaching the resultant reduced source with hydrochloric acid in a leaching zone at a temperature in the range of from about 80° to about 100° C., precipitating said leached titanium bearing source by contact with a portion of said oxidized source containing iron oxide at a temperature in the range of from about 75° to about 105° C., separating and recovering the resultant precipitated titanium dioxide, treating the soluble metal source to recover other metal values and hydrogen chloride sources and recycling said hydrogen chloride source to said leaching zone.

Other objects and embodiments will be found in the following further detailed description of the present invention.

As hereinbefore set forth, the present invention is concerned with an improved process for obtaining titanium metal values from a titanium metal bearing source such as ores including ilmenite, rutile, etc. By utilizing the present process it is possible to obtain a high yield of the desired product while utilizing relatively inexpensive equipment and also starting with a low grade ore. The process is effected by subjecting a titanium bearing source which also containes other metals such as iron, vanadium, chromium, nickel, etc., to an oxidizing step in which, in the preferred embodiment, the ore has been crushed to a particle size of less than about 100 mesh. The oxidation may be effected by contacting the ore with water for up to several days at ambient temperature or, by roasting the ore in an oxidizing atmosphere which is provided for the presence of air or oxygen, at a temperature in the range of from about 600° to about 800° C. or more for a period of time which may range from about 1 to 10 hours. Following this, the oxidized ore in which the iron values are present as iron oxides is then divided into two portions. One portion is then subjected to a reductive roast in which the ore is heated to a temperature ranging from about 600° to about 1000° C. in a reducing atmosphere. In the preferred embodiment of the invention the reducing atmosphere which is used to accomplish the purpose of the roast usually comprises a mixture of from about 50% carbon monoxide and 50% hydrogen with an excess of the reductant of from about 2 to about 3 times the amount required to completely reduce the iron which is present in the system to the metal. It is also contemplated within the scope of this invention that hydrogen or carbon monoxide may be used alone rather than in a mixture of the two.

Following the reductive roast of the metal bearing source the source is then subjected to an aqueous hydrogen chloride leach which is also effected at elevated temperatures usually in the range of from about 80° to about 100° C. or more for a period of time ranging from about 0.25 to about 1 hour or more in duration. The aqueous hydrogen chloride solution may also be characterized as hydrochloric acid and will contain from about 20% up to about 37% hydrogen chloride. Upon completion of the leaching step the leach slurry is then subjects to precipitation without removing the gangue in order that the insoluble titanium species will not be lost in separation. The precipitation of the titanium as titanium dioxide is accomplished by treating the leach slurry with the portion of the oxidized ore which also separated from the total portion of the ore and not subjected to the reductive roast. The addition of the oxidized source to the leach solution is effected at elevated temperatures ranging from about 75° to about 105° C. while subjecting the mixture to agitation or stirring for a period of time which may range from about 2 minutes up to about 1 hour or more in duration. Upon completion of the precipitation step the solids are separated from the liquids by any conventional means such as filtration or decantation of the liquid and the solid titanium dioxide is recovered. The spent leach liquor is then charged to a treatment zone in which the liquids are treated in any conventional manner such as crystallization to produce hydrated ferrous chloride or by spray drying to produce ferric oxide along with the oxides of any other dissolved metal such as vanadium, nickel and chromium. In the treatment zone the formation of the other metals which are present in the source will result in the production of a concentrated hydrochloric acid solution which then may be recycled back to the leaching zone for use as the leach liquor.

BRIEF DESCRIPTION OF THE DRAWING

The present invention will be further illustrated with reference to the accompanying drawing which sets forth a flow diagram of the process of the invention. It is to be understood that various valves, pumps, etc., have been eliminated as not being essential to the complete understanding of the invention. However, the utilization of these, as well as other similar appurtenances, will become obvious as the drawing is described.

In the process a titanium bearing source such as ilmenite, which has been crushed to the desired mesh value, is charged through line 1 to an oxidation zone 2. In this apparatus the ore source is subjected to an oxidation step by being contacted with water at ambient temperature or by an oxidizing gas such as oxygen or air at an elevated temperature. The oxidized source in which the iron values present in said source have been converted to ferric oxides is withdrawn from oxidation zone 2 through line 3. A portion of the oxidized source is passed through line 4 to reduction zone 5. In this zone the oxidized ore source is subjected to a reductive roast at a temperature in the range hereinbefore set forth in the presence of a reductant which may comprise hydrogen, carbon monoxide, or mixtures thereof, the reductant being charged to reduction zone 5 through line 6. After undergoing the reductive roast for a period of time which is predetermined in length, the titanium bearing source or ore is withdrawn from reduction zone 5 through line 7 and is passed to leaching zone 8. In leaching zone 8 the ore is subjected to the action of a hydrogen chloride source, a portion of which may be introduced into said zone through line 9. The leaching step is effected at an elevated temperature ranging from about 80° to about 100° C. for a predetermined period of time which is sufficient to convert the metals to the corresponding chlorides. Upon completion of the leach the pregnant leach liquor is withdrawn from leaching zone 8 through line 10 and passed to precipitation zone 11. In precipitation zone 11 the leach liquor is contacted with the remaining portion of the ore from oxidation zone 2, said oxidized ore being passed to precipitation zone 11 through line 12. In precipitation zone 11 the titanium is precipitated by conversion to titanium dioxide, the iron which is present in the oxidized ore source being concurrently converted to ferrous chloride which then dissolves into the leach solution. The amount of oxidized ore source which is utilized for the precipitation of titanium chloride to titanium dioxide will depend upon the amount of titanium chloride which is present in the leach solution, the optimum weight of ferric oxide which is required for the precipitation of titanium to titanium dioxide being in a weight ratio in the range of from about 1.5:1 to about 2:1 weight of ferric oxide per weight of titanium dioxide to be precipitated. The spent leach liquor which contains solid titanium dioxide is withdrawn from precipitation zone 11 through line 13 and passed to a separation zone 14 wherein the solid titanium dioxide is separated from the spent leach liquor containing dissolved metal chlorides by conventional means of the type hereinbefore set forth such as filtration, decantation, etc. The solid titanium dioxide is withdrawn through line 15 and treated by conventional means such as washing, etc., for recovery and use. The liquid spent leach liquor is withdrawn from separation zone 14 through line 16 and passed to treatment zone 17 wherein the leach liquor undergoes treatment such as crystallization to produce hydrate ferrous chloride or spray drying to produce ferric oxide along with other vanadium oxides, nickel oxides, chromium oxides, etc. The solid oxides are withdrawn from treatment zone 17 through line 18. Concurrent with the production of the oxides in treatment zone 17 is the production of concentrated hydrochloric acid solution. This solution is withdrawn through line 19 and recycled to leaching zone 8 for use as a portion of the leach liquor.

The following examples are given for purposes of illustrating the process of the present invention. However, it is to be understood that these examples are given merely for purposes of illustration and that the present invention is not necessarily limited thereto.

EXAMPLE I

A Norwegian ilmenite ore which analyzed a 30% iron and 28% titanium was crushed to −35 mesh Tyler. The crushed ore (140 grams) was reduced at a temperature of 750° C. for a period of 1 hour using about 2.5 times the stoichiometric requirement of reducing atmosphere (50% hydrogen, 50% carbon monoxide) to reduce all of the iron to metal. In addition 50 grams of a domestic ilmenite ore was assayed at 35% iron and 33% titanium was also crushed to −35 mesh and roasted for a period of 4 hours at 750° C. under a moist oxygen atmosphere. Following this 35 grams of the reduced ilmenite ore was leached for a period of 15 minutes at a temperature of 100° C. under reflux utilizing 300 cc of concentrated hydrochloric acid. The solution was filtered and the products were analyzed, the 11.5 grams of solid were found to contain 29% titanium and 3.4% iron. In addition the liquid was found to contain 26 grams per liter of titanium. A portion of the solution, namely 100 cc, was heated to a temperature of 80° C. and 18.5 grams of the oxidized ilmenite ore were added to the solution. The mixture was allowed to stand for a period of 5 minutes without stirring followed by 55 minutes with stirring while maintaining the temperature at 80° C. The precipitation resulted in the production of 13.5 grams of a solid which analyzed out at 55% titanium ad 11% iron along with 88 cc of a solution which contained 15 grams per liter of titanium. Therefore, the process resulted in the production of 87% of the titanium in the solid while 89% of the iron had been removed along with the solution.

EXAMPLE II

In this example a Canadian ilmenite was crushed to −28 mesh Tyler and reduced at a temperature of 750° C. for a period of 1 hour using about two times the amount of the required reductant, said reductant comprising a mixture of 50% carbon monoxide and 50% hydrogen. The reduced ilmenite was leached at a temperature of 100° C. for a period of about 15 minutes using 300 cc of hydrochloric acid. Analysis of the gangue and solution disclosed that there had been a 97% extraction of the titanium. Following this, 100 cc of the solution which contained 48 grams per liter of titanium was heated to a temperature of 80° C. and mixed with an oxidized ilmenite which had been ground to −270 mesh. The oxidized ilmenite which assayed at 27% titanium and 31% iron was oxidized by allowing it to stand in aerated water for a period of 48 hours. The slurry of oxidized ilmenite and soluble titanium was reacted for 1 minute without stirring and for 4 minutes with stirring. The titanium dioxide precipitated out and after decanting the solid from the solution the former were analyzed and found to contain 38% titanium and 19% iron while the liquid was found to contain 39 grams per liter of titanium.

EXAMPLE III

In this example 50 grams of the tails resulting from the leaching of an ilmenite ore were oxidized for a period of 0.5 hours at 900° C. under an oxygen atmosphere. The solids were mixed with 140 cc of a leached solution containing 60 grams per liter of titanium, the admixing being effected while maintaining the temperature of the solution at 950° C. After allowing the reaction to proceed for a period of 15 minutes the solids were filtered and washed. The solution was cooled in ice water and refiltered to remove crystalline ferrous chloride hydrate. The products which comprise 41 grams of leach tails assayed out at 73% titanium and 1.5% iron as compared to an initial assay of 69% titanium and 3.6% iron. The spent leach liquor was analyzed and found to contain 71 grams per liter of titanium and 15 grams per liter of iron along with 15.4 grams of the ferrous chloride hydrate which analyzed out as 26% iron.

I claim as my invention:

1. A process for the recovery of titanium values from a titanium-bearing source which contains other metal values selected from the group consisting of iron, vanadium, nickel, and chromium, said process comprising:
    (a) oxidizing said source at a temperature in the range of from about ambient to about 800° C. to convert iron values contained therein to iron oxide;
    (b) subjecting a portion of said oxidized source to a reductive roast at elevated temperatures;
    (c) leaching said resultant reduced source with a hydrogen chloride source in a leaching zone at a temperature of from about 80° to about 100° C. to form a leach slurry;
    (d) contacting said leached slurry with the remaining portion of said oxidized source containing iron oxides at a temperature in the range of from about 75° to about 105° C. to separate titanium oxides or hydrous oxide;
    (e) recovering the separated titanium values;
    (f) treating the resultant solution to recover said other metal values and to form a hydrogen chloride source; and
    (g) recycling said hydrogen chloride source to said leaching zone.

2. The process as set forth in claim 1 in which said oxidizing step is effected in an oxidizing atmosphere.

3. The process as set forth in claim 2 in which said oxidizing atmosphere comprises air.

4. the process as set forth in claim 2 in which said oxidizing atmosphere comprises oxygen.

5. The process as set forth in claim 1 in which said reductive roast is effected at a temperature in the range of from about 600° to about 1000° C. in a reducing atmosphere.

6. The process as set forth in claim 5 in which said reducing atmosphere is selected from the group consisting of hydrogen, carbon monoxide, and combinations thereof.

7. The process as set forth in claim 1 in which said hydrogen chloride source is aqueous hydrochloric acid.

8. The process as set forth in claim 1 in which the amount of iron oxide in said oxidized titanium bearing source which is utilized to effect the recovered of said titanium is in a weight ratio in the range of from about 1.5:1 to about 2:1 units of weight per unit of titanium to be precipitated.

* * * * *